United States Patent [19]

Brewer

[11] Patent Number: 4,474,835
[45] Date of Patent: Oct. 2, 1984

[54] COMPOSITION AND METHOD FOR PREVENTING ADHESION OF GRASS TO LAWN MOWER CARRIAGE AND BLADES

[76] Inventor: J. C. Brewer, c/o Brewer Chemical, 300 Stokes Ave., Trenton, N.J. 08638

[21] Appl. No.: 567,658

[22] Filed: Jan. 3, 1984

[51] Int. Cl.³ .............................................. B05D 3/02
[52] U.S. Cl. ...................................... 427/387; 106/2; 427/429; 427/421
[58] Field of Search ................ 427/368, 421, 387, 429; 106/2

[56] References Cited

U.S. PATENT DOCUMENTS

| | | |
|---|---|---|
| 2,774,674 | 12/1956 | Dumas . |
| 3,097,467 | 7/1963 | Konrad . |
| 3,460,981 | 8/1969 | Keil ........................................ 106/2 |
| 3,481,768 | 12/1969 | Gowdy ................................... 106/2 |
| 3,490,212 | 1/1970 | Hengesbach . |
| 3,615,826 | 10/1971 | Brill et al. . |
| 3,648,446 | 3/1972 | Haapoja et al. . |
| 3,684,756 | 8/1972 | Brooks . |
| 3,700,013 | 10/1972 | Coffey et al. .......................... 106/2 |
| 3,770,633 | 11/1973 | Holley et al. ......................... 106/2 |
| 4,011,362 | 3/1977 | Stewart . |
| 4,271,215 | 6/1981 | Coon . |
| 4,349,586 | 9/1982 | Sejournant ............................ 106/2 |

*Primary Examiner*—Norman Morgenstern
*Assistant Examiner*—Janyce A. Bell
*Attorney, Agent, or Firm*—Z. T. Wobensmith, III

[57] ABSTRACT

A method and compositions are disclosed which reduce the tendency of cut grass or debris to adhere to the surfaces of a lawn mower. The compositions comprises mineral oil and a silicone fluid. The compositions may be brushed or sprayed onto the exposed mower surfaces, and allowed to dry prior to use of the mower.

7 Claims, No Drawings

COMPOSITION AND METHOD FOR PREVENTING ADHESION OF GRASS TO LAWN MOWER CARRIAGE AND BLADES

BACKGROUND OF THE INVENTION

1. Field of the Invention

This invention relates to chemical compositions and a method for their application to the underside and other parts of lawn mower decks, in order to prevent grass or other debris from adhering to the lawn mower decks or blades.

2. DESCRIPTION OF THE PRIOR ART

When operating a lawn mower, particularly in either high, thick or wet grass, problems are often encountered with the lawnmower becoming clogged with cut grass, dirt or other debris. The cut grass tends to adhere to the underside of the mower deck, the mower blades, and around the chute area from which cut grass is expelled. This clogging can result in considerable equipment down-time, which is spent unclogging and removing grass, as well as a decrease in fuel-efficiency and decrease in operating life of the equipment as a result of the mower blades not being able to rotate as freely as they should.

The problem is particularly severe for those personnel mowing large tracts of grass on a regular basis, such as the borders of highways. Such personnel, to stay on schedule, must mow the grass on a particular day regardless of its condition. In addition to mowing wet grass, it is also often necessary to mow grass on uneven terrain, where much of the cut grass is directed against the mower's lower deck to which it can adhere and become lodged.

It is known that various polysiloxanes, either alone or in combination with a solvent, can serve as a release agent. The following references are representative.

U.S. Pat. No. 2,774,674 to Dumas teaches an antiadhesion composition for preventing tar, wax, etc. from adhering to a fibrous surface such as paper. The composition comprises an organopolysiloxanic oil, a filler, an emulsifier, and an alkali salt of an organosilane-triol.

U.S. Pat. No. 4,271,215 to Coon discloses a composition for releasing ice. It comprises a siloxane fluid, a titanate compound, and a diluent such as naphtha mineral spirits.

U.S. Pat. No. 4,011,362 to Stewart discloses a metal substrate treated with carboxyfunctional siloxanes. Such surfaces are useful in the fuser rolls of copy machines.

U.S. Pat. No. 3,684,756 to Brooks teaches a mold release composition comprising organopolysiloxane, an alkoxylated silicone resin, and the silicon resin of an organometallic compound.

U.S. Pat. No. 3,615,826 to Brill et al. teaches the use of a composition comprising polydimethylsiloxane, a siloxane resin, a metal oxide, and a solvent as an oven cleaner.

Attempts to mechanically clear the underside of a lawn mower exist in the art. U.S. Pat. No. 3,097,467 to Konrad teaches a vibrating disc driven by the mower's exhaust, U.S. Pat. No. 3,490,212 to Hengesbach discloses an attachment for spraying water on or above the blade, and U.S. Pat. No. 3,648,446 to Haapoja et al. teaches a water conduit for flushing out the cut grass.

The invention provides chemical compositions, and a method of treating the painted and other surfaces of a lawn mower, which is not shown or described in the prior art.

SUMMARY OF THE INVENTION

This invention relates to chemical compositions and a method of treating the carriage or underbody and the blades of a mower so that grass, including thick or wet grass, and other debris will not adhere to the deck and blades, and otherwise clog the mower. The method comprises applying to the mower deck and blades, prior to use of the mower, a composition comprising mineral oil and an effective amount of silicon fluid, such as polydimethyl siloxane.

It is the principal object of the invention to provide chemical compositions and a method for treating mower surfaces such as the carriage or deck and the blades of a mower to reduce the adherence of cut grass and debris.

It is a further object of the invention to provide chemical compositions and a method wherein the down-time and loss of power associated with clogging of the carriage and the blades of a mower is reduced.

It is a further object of the invention to provide chemical compositions and a method wherein the desired effects are achieved in a simple, easy-to-use manner.

It is a further object of the invention to provide a chemical composition and a method wherein the aforesaid results are achieved without providing additional structural parts on, or altering the design of, the mower.

Other objects and advantageous features of the invention will be apparent from the description and claims.

DESCRIPTION OF THE EMBODIMENT

Applicant has discovered chemical compositions and a method wherein the adhesion of cut grass and debris to the blades, wheels, underbody, and other exposed portions of a lower mower is reduced by applying one of the compositions thereto prior to use.

The compositions comprise mineral oil and an effective amount of silicone fluid. One of the compositions is applied to the underside of the mower, including the blades, wheels, and exhaust chute, in any suitable manner, such as brushing or spraying. The composition is then allowed to dry, prior to using the mower, which usually requires less than 30 minutes.

The deck of the lawn mower is generally composed of a painted metal substrate. The mower blades are metal, and the wheels generally metal or plastic. The compositions, which are compatible with the mower parts to be treated, are applied directly to, and are equally effective on, each of the surfaces that need treatment.

The term "mineral oil" refers to petroleum products or petroleum-derived products including wax-base, asphalt-base, mixed-base, lubricants, paraffins, etc.

The term "silicone fluid" as used herein refers to organosiloxane polymers in a liquid form. The preferred polymers are polydimethyl siloxanes, which are sold under the name "Dow Corning 200 Fluids", and which are available from Dow Corning Corporation, South Sagimaw, Midland, Mich. 48640. These fluids are available in a variety of viscosity grades. The range of viscosity grades prefered for use in the compositions of the inventions are those having a viscosity of from 5 to 100,000 centistokes at 25° C. In the preferred embodiment, a fluid having a viscosity of approximately 300 centistokes at 25° C. is used.

The proportions in which the mineral oil and the polysiloxane are mixed can be varied depending on the viscosity of the polysiloxane. Generally, the compositions found to be most effective contain between 3% and 25% by volume of silicone fluid. Correspondingly, the compositions contain from 75% to 97% by volume mineral oil. When a polysiloxane oil having a viscosity value of 300 centistokes is employed, it has been found that a ratio of 95 parts mineral oil to 5 parts polysiloxane fluid, both by volume, is very effective. A composition prepared in these proportions is capable of being easily sprayed or otherwise applied to the desired mower surfaces.

Although the compositions of the present invention are capable of substantially reducing the adhesion of grass and debris to the mower, they do not totally eliminate such accumulation. It has been found that the amount of grass or debris which adheres to the treated surfaces is reduced by approximately 66%.

The composition should always be applied to a clean mower surface. When using the compositions frequently, such as on large mowers that are used daily, the following procedure is suggested. First, the composition is applied to a clean, dry mower surface, then allowed to dry. After use, the residual grass or debris if any which has adhered to the mower surface is washed or otherwise removed. When the surface has dried, a fresh composition is applied, which is allowed to dry, and the mower is then ready for its next use.

It should be noted that when using the composition, one should avoid applying it to the mower drive or turning wheels, drive belts, steering wheel, or brake and clutch pedals, since such surfaces could become slippery and cause injury to the user.

It is therefore apparent that chemical compositions and a method for their use have been provided with which the objects of the invention are achieved.

I claim:

1. A method of treating the exposed surfaces of a lawn mower to reduce the tendency of cut grass or debris to adhere thereto, comprising
    applying to said exposed surfaces a composition comprising mineral oil and an effective amount of silicone fluid, and
    allowing said composition to dry on said exposed surfaces.

2. The method of claim 1 wherein said silicon fluid is a polydimethyl siloxane.

3. The method of claim 2 wherein said polydimethyl siloxane has a viscosity of between 5 and 100,000 centistokes.

4. The method of claim 1 wherein said mineral oil and said siloxane, respectively, are combined in a ratio by volume of from 75/25 to 97/3.

5. The method of claim 1 wherein said mineral oil and said siloxane are combined in a ratio of approximately 95/5, respectively, by volume.

6. The method of claim 1 wherein said composition is applied by spraying.

7. The method of claim 1 wherein said composition is applied by brush.

* * * * *